(12) United States Patent
Ryspekov

(10) Patent No.: US 11,029,920 B1
(45) Date of Patent: Jun. 8, 2021

(54) EXECUTION OF A CONDITIONAL STATEMENT BY AN ARITHMETIC AND/OR BITWISE UNIT

(71) Applicant: Chariot Technologies Lab, Inc., Wilmington, DE (US)

(72) Inventor: Timur Ryspekov, Almaty (KZ)

(73) Assignee: Chariot Technologies Lab, Inc., Wilmington, DE (US)

( * ) Notice: Subject to any disclaimer, the term of this patent is extended or adjusted under 35 U.S.C. 154(b) by 0 days.

(21) Appl. No.: 17/076,726

(22) Filed: Oct. 21, 2020

(51) Int. Cl.
  *G06F 7/57* (2006.01)
  *G06F 8/41* (2018.01)
  *G06F 9/30* (2018.01)

(52) U.S. Cl.
  CPC ............... *G06F 7/57* (2013.01); *G06F 8/443* (2013.01); *G06F 8/4441* (2013.01); *G06F 9/30072* (2013.01)

(58) Field of Classification Search
  CPC ........ G06F 8/41; G06F 9/30145; G06F 8/314; G06F 8/443; G06F 8/445; G06F 7/57; G06F 8/4441; G06F 9/30072
  See application file for complete search history.

(56) References Cited

U.S. PATENT DOCUMENTS

| | | | |
|---|---|---|---|
| 6,915,410 B2 | 7/2005 | Hyduke | |
| 8,180,821 B2 | 5/2012 | Mellott | |
| 9,460,075 B2 | 10/2016 | Mungi et al. | |
| 9,588,765 B2 | 3/2017 | Fletcher | |
| 9,618,925 B2 | 4/2017 | Eldridge et al. | |
| 2004/0083251 A1 | 4/2004 | Geiringer et al. | |
| 2010/0199354 A1* | 8/2010 | Eker | G06F 21/14 726/26 |
| 2019/0317766 A1 | 10/2019 | Zhang et al. | |
| 2020/0366492 A1* | 11/2020 | Covaci | G06F 16/27 |

FOREIGN PATENT DOCUMENTS

CN  108292295 A  7/2018

OTHER PUBLICATIONS

Robert D. Cameron et al.; Bitwise Data Parallelism in Regular Expression Matching; ACM; pp. 139-150; retrieved on Jan. 26, 2021 (Year: 2014).*

(Continued)

*Primary Examiner* — S. Sough
*Assistant Examiner* — Cuong V Luu
(74) *Attorney, Agent, or Firm* — Fish & Richardson P.C.

(57) ABSTRACT

Methods, systems, and apparatus, including computer programs encoded on computer storage media, for execution of a conditional statement by an arithmetic and/or bitwise unit. A computer program that comprises a conditional statement that comprises a boolean condition is accessed. The boolean condition is transformed into an arithmetic and/or bitwise expression of the boolean condition. An arithmetic and/or bitwise expression of the computer program comprises the arithmetic and/or bitwise expression of the boolean condition in place of the boolean condition. The arithmetic and/or bitwise expression of the computer program is executed by an arithmetic and/or bitwise operation unit of a processor.

20 Claims, 19 Drawing Sheets

(56) References Cited

OTHER PUBLICATIONS

Weijie Feng et al.; NeuReduce Reducing Mixed Boolean-Arithmetic Expressions by Recurrent Neural Network; Association for Computational Linguistics; retrieved on Jan. 26, 2021 (Year: 2020).*

Mora-Mora et al., "Mathematical model of stored logic based computation", Mathematical and Computer Modelling 52 (2010) 1243-1250.

Eric B. Olsen, "Introduction of the Residue Number Arithmetic Logic Unit With Brief Computational Complexity Analysis", White paper, Rev 1.45, excerpted from "General Arithmetic in Residues", Nov. 12, 2012, pp. 1-20.

PatentManiac, Patentability Search Report, dated May 29, 2020, 26 pages.

* cited by examiner

310

If (boolean condition *301*) Then
   (consequent task *302*)
Else
   (alternative task *303*)
End If

FIG. 3

```
┌─────────────────────────────────────────────────┐
│  Multiply the consequent task by the arithmetic and/or  │
│   bitwise expression of the boolean condition          │
│                      810                                │
└─────────────────────────────────────────────────┘
                         │
                         ▼
┌─────────────────────────────────────────────────┐
│ Multiply the alternative task by 1 minus the arithmetic and/ │
│    or bitwise expression of the boolean condition      │
│                      820                                │
└─────────────────────────────────────────────────┘
```

FIG. 8

```
┌─────────────────────────────────────────────────┐
│  Include in the arithmetic and/or bitwise expression of the  │
│      computer program an unconditional jump to a label       │
│ associated with the arithmetic and/or bitwise expression of  │
│                  the boolean condition                       │
│                          910                                 │
└─────────────────────────────────────────────────┘
```

FIG. 9

Fragment the arithmetic and/or bitwise expression of the computer program into multiples fragments of arithmetic and/or bitwise expression
1010

Execute the fragments in parallel
1020

FIG. 10

Figures 11A, 11B:
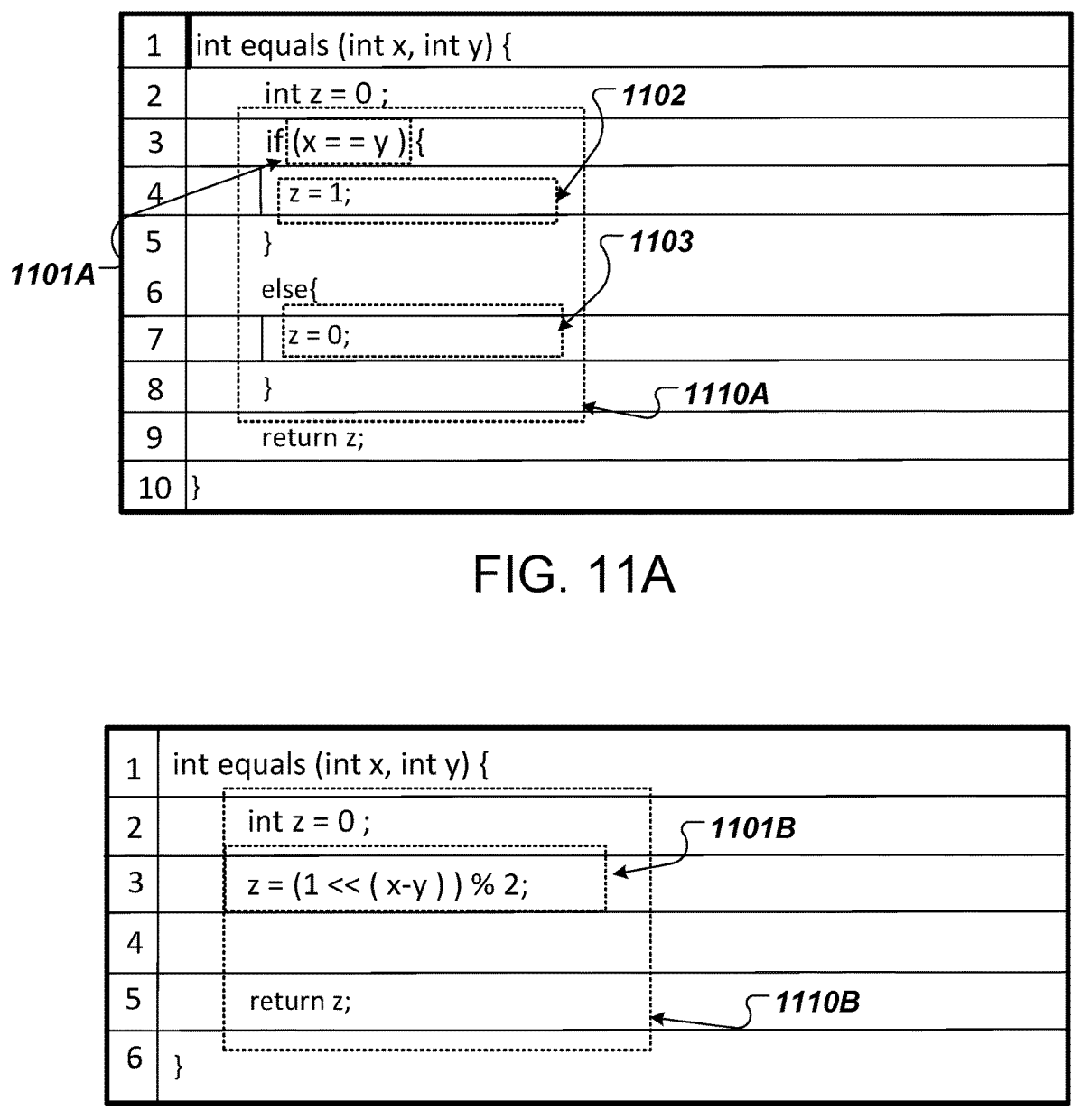

| 1 | int equals (int x, int y) { |
|---|---|
| 2 | int z = 0 ; |
| 3 | if (x = = y ) { |
| 4 | z = 1; |
| 5 | } |
| 6 | else{ |
| 7 | z = 0; |
| 8 | } |
| 9 | return z; |
| 10 | } |

| 1 | int equals (int x, int y) { |
|---|---|
| 2 | int z = 0 ; |
| 3 | z = (1 << ( x-y ) ) % 2; |
| 4 | |
| 5 | return z; |
| 6 | } |

```
1   equals (int, int) :
2              push    rbp
3              mov     rbp, rsp
4              mov     DWORD PTR [rbp-20], edi
5              mov     DWORD PTR [rbp-24], esi
6              mov     DWORD PTR [rbp-4], 0
7              mov     eax, DWORD PTR [rbp-20]
8  ✓           cmp     eax, DWORD PTR [rbp-24]
9              jne     .L2
10             mov     DWORD PTR [rbp-4], 1
11             jmp     .L3
12  .L2:
13             mov     DWORD PTR [rbp-4], 0
14  .L3:
15             mov     eax, DWORD PTR [rbp-4],
16             pop     rbp
17             ret
```

FIG. 11C

| | | | |
|---|---|---|---|
| 1 | equals (int, int) : | | |
| 2 | | push | rbp |
| 3 | | mov | rbp, rsp |
| 4 | | mov | DWORD PTR [rbp-20], edi |
| 5 | | mov | DWORD PTR [rbp-24], esi |
| 6 | | mov | DWORD PTR [rbp-4], 0 |
| 7 | | mov | eax, DWORD PTR [rbp-20] |
| 8 | | sub | eax, DWORD PTR [rbp-24] |
| 9 | | mov | edx, 1 |
| 10 | | mov | ecx, eax |
| 11 | | sal | edx, cl |
| 12 | | mov | eax, edx |
| 13 | | cdq | |
| 14 | | shr | edx, 31 |
| 15 | | add | eax, edx |
| 16 | | and | eax, 1 |
| 17 | | sub | eax, edx |
| 18 | | mov | DWORD PTR [rbp-4], eax |
| 19 | | mov | eax, DWORD PTR [rbp-4] |
| 20 | | pop | rbp |
| 21 | | ret | |

```
1   #include <iostream>
2   using namespace std;
3   int equals (int x, int y) {        ⌐1201
4       if (x == y) {
5           cout<<"Equals" ;           ⌐1202
6       }
7       else {
8           cout<<"Not equals" ;
9       }                              ⌐1210A
10
11
12      return 0;
13  }
14
```

```
1   #include <iostream>
2   using namespace std;                              ⟵ 1210B
3   int equals (int x, int y)  {
4
5
6       //if conversion starts
7       int k = x - y;
8       int res = (1 << k) % 2;        ⟵ 1201B
9       //if conversion ends
10
11      //initialization links based on results
12      void* condition  [2] ;
13      void* yes = &&to_do;
14      void* no = &&else_do;
15      condition [1]  = yes;
16      condition [0] = no;                           ⟵ 1205
17                                      ⟵ 1204
18      goto *condition [res];
19      to_do:                          ⟵ 1201
20          cout<<"Equals"<<endl;       ⟵ 1202
21          goto finish;
22      else_do:
23          cout<<"Not equals"<<endl;
24          goto finish;
25      finish:
26          return 0;
27
28  }
```

FIG. 12B

```
 1  .LC0:
 2      .string "Equals"
 3  .LC1:
 4      .string "Not Equals"
 5  equals (int, int):
 6      push    rbp
 7      mov     rbp, rsp
 8      sub     rsp, 16
 9      mov     DWORD PTR [rbp-4], edi
10      mov     DWORD PTR [rbp-8], esi
11      mov     eax, DWORD PTR [rbp-4]
12      cmp     eax, DWORD PTR [rbp-8]
13      jne     .L2
14      mov     esi, OFFSET FLAT: .LC0
15      mov     edi, OFFSET FLAT: _ZSt4cout
16      call    std::basic_ostream<char, std::char_traits<char> >& std::operator<< <std::char_traits<char> >(std::basic_ostream<char, std::char_traits<char> >&, char const*)
17      jmp     .L3
18  .L2:
19      mov     esi, OFFSET FLAT: .LC1
20      mov     edi, OFFSET FLAT: _ZSt4cout
21      call    std::basic_ostream<char, std::char_traits<char> >& std::operator<< <std::char_traits<char> >(std::basic_ostream<char, std::char_traits<char> >&, char const*)
22  .L3:
23      mov     eax, 0
24      leave
25      ret
```

FIG. 12C

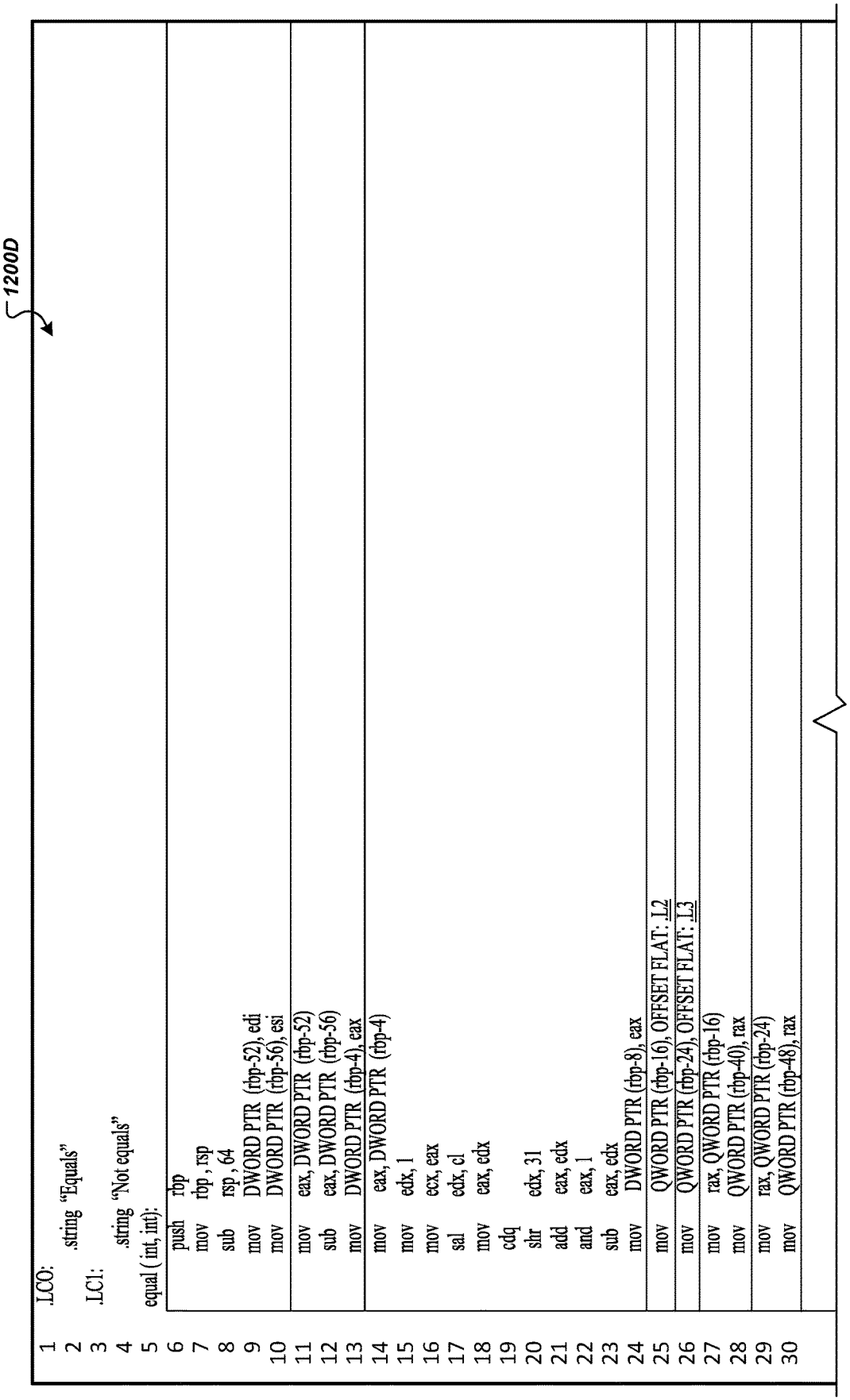

FIG. 12D

```
 1   .LC0:
 2        .string "Equals"
 3   .LC1:
 4        .string "Not equals"
 5   equal ( int, int):
 6        push   rbp
 7        mov    rbp, rsp
 8        sub    rsp, 64
 9        mov    DWORD PTR (rbp-52), edi
10        mov    DWORD PTR (rbp-56), esi
11        mov    eax, DWORD PTR (rbp-52)
12        sub    eax, DWORD PTR (rbp-56)
13        mov    DWORD PTR (rbp-4), eax
14        mov    eax, DWORD PTR (rbp-4)
15        mov    edx, 1
16        mov    ecx, eax
17        sal    edx, cl
18        mov    eax, edx
19        cdq
20        shr    edx, 31
21        add    eax, edx
22        and    eax, 1
23        sub    eax, edx
24        mov    DWORD PTR (rbp-8), eax
25        mov    QWORD PTR (rbp-16), OFFSET FLAT: L2
26        mov    QWORD PTR (rbp-24), OFFSET FLAT: L3
27        mov    rax, QWORD PTR (rbp-16)
28        mov    QWORD PTR (rbp-40), rax
29        mov    rax, QWORD PTR (rbp-24)
30        mov    QWORD PTR (rbp-48), rax
```

```
31      mov     eax, DWORD PTR [rbp-8]
32      cdqe
33      mov     rax, QWORD PTR [rbp-48+rax*8]
34      nop
35      jmp     rax
36  .L2:
37      mov     esi, OFFSET FLAT:.LC0
38      mov     edi, OFFSET FLAT:_ZSt4cout
39      call    std::basic_ostream<char, std::char_traits<char> >& std::operator<< <std::char_traits<char> >(std::basic_ostream<char, std::char_traits<char> >&, char const*)
40      mov     esi, OFFSET FLAT:_ZSt4endIIcSt11char_traitsIcEERSt13basic_ostreamIT_T0_ES6_
41      mov     rdi, rax
42      call    std::basic_ostream<char, std::char_traits<char> >::operator<<(std::basic_ostream<char, std::char_traits<char> >& (*)(std::basic_ostream<char, std::char_traits<char> >&))
43      jmp     .L5
44  .L3:
45      mov     esi, OFFSET FLAT:.LC1
46      mov     edi, OFFSET FLAT:_ZSt4cout
47      call    std::basic_ostream<char, std::char_traits<char> >& std::operator<< <std::char_traits<char> >(std::basic_ostream<char, std::char_traits<char> >&, char const*)
48      mov     esi, OFFSET FLAT:_ZSt4endIIcSt11char_traitsIcEERSt13basic_ostreamIT_T0_ES6_
49      mov     rdi, rax
50      call    std::basic_ostream<char, std::char_traits<char> >::operator<<(std::basic_ostream<char, std::char_traits<char> >& (*)(std::basic_ostream<char, std::char_traits<char> >&))
51      nop
52  .L5:
53      mov     eax, 0
54      leave
55      ret
```

FIG. 12D (cont)

EXECUTION OF A CONDITIONAL STATEMENT BY AN ARITHMETIC AND/OR BITWISE UNIT

BACKGROUND

This description relates generally to computing systems and more particularly to the execution of conditional statements and expressions by a computing circuit.

In computer science, conditional statements are features of a programming language, which perform different computations or actions depending on whether a specified boolean condition evaluates to True or False.

The execution of a conditional statement requires the evaluation of a boolean condition, and thus the comparison of numbers. This comparison determines whether one number is greater than, equal, or less than the other number. Boolean conditions are conventionally evaluated by a digital comparator. A digital comparator is a hardware electronic device that takes two numbers as input in binary form and determines whether one number is greater than, less than or equal to the other number.

Conditional statements use the output of the digital comparator to switch to executing either one or another piece of the computer code. Each whole «if-then do»operation of the digital comparator takes at least 2 clock cycles of a processor. In addition, the digital comparator is often unable to perform parallel execution of multilevel conditional tasks. As a result, the digital comparator (or the logic block of ALU) often constitutes a bottleneck of an integrated circuit processor.

SUMMARY

This specification describes how a system can execute a computer program comprising conditional statements solely with an arithmetic block and/or a bitwise unit of a processor.

Particular embodiments of the subject matter described in this specification can be implemented so as to realize one or more of the following advantages.

The conditional statements are transformed into a set of arithmetic and/or bitwise operations. As such, the computer program can be executed solely by an arithmetic and/or bitwise unit of the processor. In particular, the computer program can be executed without using a digital comparator. As explained above, each whole operation of the digital comparator takes at least 2 clock cycles of a processor. Arithmetic units of a processor, on the other hand, are capable of executing the vast majority of arithmetic calculations in 1 clock cycle. As such, the techniques described in this specification improve the execution speed of a computer program by the processor. The digital comparator can be removed which allows more space for arithmetic and/or bitwise operation units. For a constant chip size, the power of the chip can thus be increased resulting in an increased execution speed.

Further, the digital comparator is often unable to perform parallel execution of multilevel conditional tasks. As a result, the digital comparator often constitutes a bottleneck of an integrated circuit processor. Arithmetic and/or bitwise expressions, on the other hand, can be fragmented into multiples fragments, which can then be executed by multiple arithmetic and/or bitwise blocks in parallel. As such, the techniques described in this specification can further improve the execution speed of the processor by executing the computer program by multiple arithmetic blocks working in parallel.

The method can be used on various levels of any suitable programming language. In particular, the method can be used in any suitable low-level language (e.g., assembly language, or at the level of the instruction set architecture (ISA)), as well as in any suitable high-level programming language (e.g., C++ code, or Java, etc.) of a particular software program.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF DRAWINGS

FIG. 3 is a pseudocode that illustrates the basic structure of an if-then(-else) conditional statement.

FIG. 8 is a flowchart of an example process for generating an arithmetic and/or bitwise expression of the computer program when the conditional statement has an arithmetic body.

FIG. 9 is a flowchart of an example process for generating an arithmetic and/or bitwise expression of the computer program when the conditional statement has a non-arithmetic body.

FIG. 10 is a flowchart of an example process for providing the arithmetic and/or bitwise expression of the computer program.

FIG. 11A is an example of a C++ computer program that comprises a conditional statement with arithmetic body. FIG. 11B is an example of a C++ computer program resulting from the transformation of the computer program of FIG. 11A. FIG. 11C is an example of an assembly language computer program that comprises a conditional statement with arithmetic body. FIG. 11D is an example of an assembly language computer program resulting from the transformation of the computer program of FIG. 11C.

FIG. 12A is an example of a C++ computer program that comprises a conditional statement with a non-arithmetic body. FIG. 12B is an example of a C++ computer program resulting from the transformation of the computer program of FIG. 12A. FIG. 12C is an example of an assembly language computer program that comprises a conditional statement with non-arithmetic body. FIG. 12D is an example of an assembly language computer program resulting from the transformation of the computer program of FIG. 12C.

DETAILED DESCRIPTION

Figure 1:
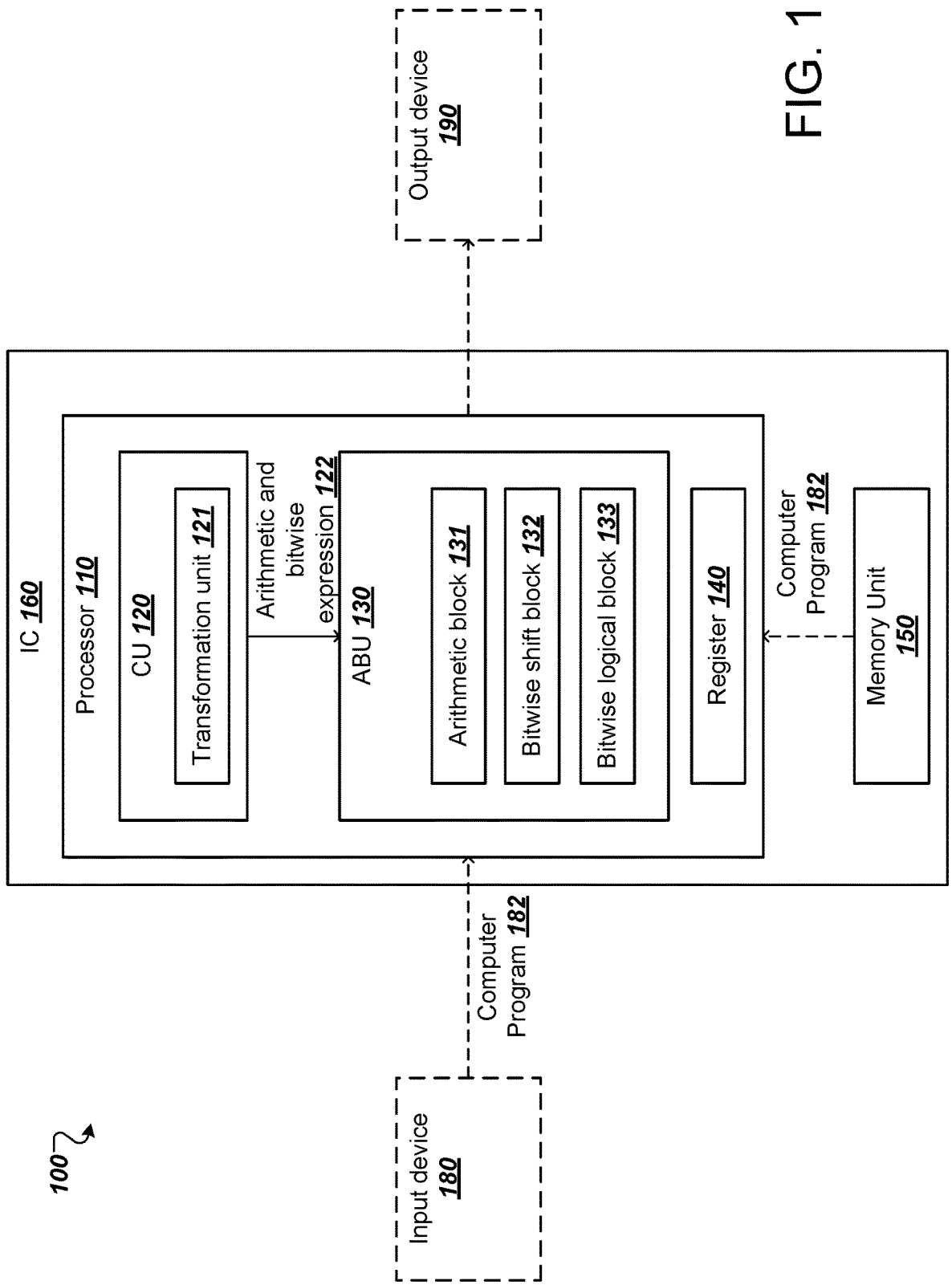
FIG. 1 is a diagram that illustrates an example system.

FIG. 1 is a diagram that illustrates an example system 100. The system 100 is an example of a system that can implement the techniques described in this specification.

The system 100 includes a processor 110, such as a Central Processing Unit (CPU), a Graphics Processing Unit (GPU), a Neural Processing Unit (NPU), a Tensor Processor Unit (TPU), or any other type of processing units that enable the execution of conditional tasks. The processor performs basic arithmetic, logic, controlling, and input/output (I/O) operations specified by instructions in a computer program 182. The processor 110 can be a microprocessor, where the CPU is contained on a single metal-oxide-semiconductor (MOS) integrated circuit (IC) chip 160. The IC that contains a CPU can also contain a memory unit 150 such as a dynamic random-access memory (DRAM), as well as more than one level of cache memory, and peripheral interfaces to connect to input device(s) 180 or output device(s) 190.

The processor 110 includes a number of functional components including one or more arithmetic and/or bitwise operation units (ABUs) 130 that perform arithmetic and bitwise logic operations, one or more registers 140 that supply operands to the ABUs 130 and store the results of ABUs operations, and one or more control units (CUs) 120 that orchestrate the execution of instructions by directing the coordinated operations of the ABUs 130, registers 140 and other components.

The ABU 130 is a digital circuit that performs arithmetic and/or bitwise logic operations. The ABU 130 can include one or more arithmetic blocks 131, one or more bitwise shift blocks 132, and one or more bitwise logical blocks 133. The arithmetic block 131 performs arithmetic operations such as Add, Add with carry, Subtract, Subtract with borrow. The bitwise shift block 132 performs bit shift operations such as Arithmetic shift, Logical shift, Rotate, Rotate through carry. The bitwise logical block 133 performs bitwise logic operations such as AND, OR, Exclusive-OR. In some embodiments, the ABU 130 does not include any digital comparator. In some embodiments, the processor 110 does not include any digital comparator.

In operation, the processor 110 accesses and executes a computer program 182 comprising a sequence of instructions. The computer program 182 can be accessed from the memory unit 150 or from an input device 180. The processor can follow an instruction cycle including fetch, decode and execute steps. Multiple instructions can be fetched, decoded and executed simultaneously. The execute step can consist of a single action or a sequence of actions. During each action, various parts of the processor are electrically connected so they can perform all or part of the desired operation and then the action is completed. The results can be written to one of the registers 140 or to the memory unit 150.

The CU 120 directs the operation of the processor 110. The CU 120 controls the memory 150, ABU 130 to respond to the computer program 182 that has been accessed by the processor. In particular, the CU 120 can direct the operation of the other units by providing timing and control signals.

In some embodiments, the CU 120 comprises a transformation unit 121 that transforms the computer program 182 into an arithmetic and/or bitwise expression 122 of the computer program. The transformation unit 121 identifies and transforms conditional statements found in the computer program 182 into arithmetic and/or bitwise expressions of the conditional statements. The transformation unit 121 generates an arithmetic and/or bitwise expression 122 of the computer program 182 based on the arithmetic and/or bitwise operations and operands. The CU 120 then provides the arithmetic and/or bitwise expression 122 of the computer program 182 to the ABU 130. In other embodiments, the system comprises a separate data processing apparatus that identifies and transforms conditional statements found in the computer program 182 into arithmetic and/or bitwise expressions of the conditional statements.

In some embodiments, the arithmetic and/or bitwise expression of the conditional statements comprises only arithmetic and/or bitwise operations. In some embodiments, substantially all of the conditional statements (e.g., more than 50%, more than 60%, more than 70%, more than 80%, more than 90%, or more than 95%) are transformed, but some conditional statements need not be transformed if the processor still includes a digital compactor that can be used to evaluate a defined proper subset of the conditional statements.

The ABU 130 accesses the arithmetic and/or bitwise expression 122 of the computer program 182 from the CU 120. The ABU 130 can access operands from the registers 140 or the memory unit 150. Operands may also be constants generated by the ABU 130 itself. The ABU 130 may also access status information, which convey information about a previous operation or a current operation. The ABU 130 outputs the result of the performed operations. The result can consist of both a data word, and/or status information. The result can be stored in the register 140 or memory unit 150.

Figure 2:
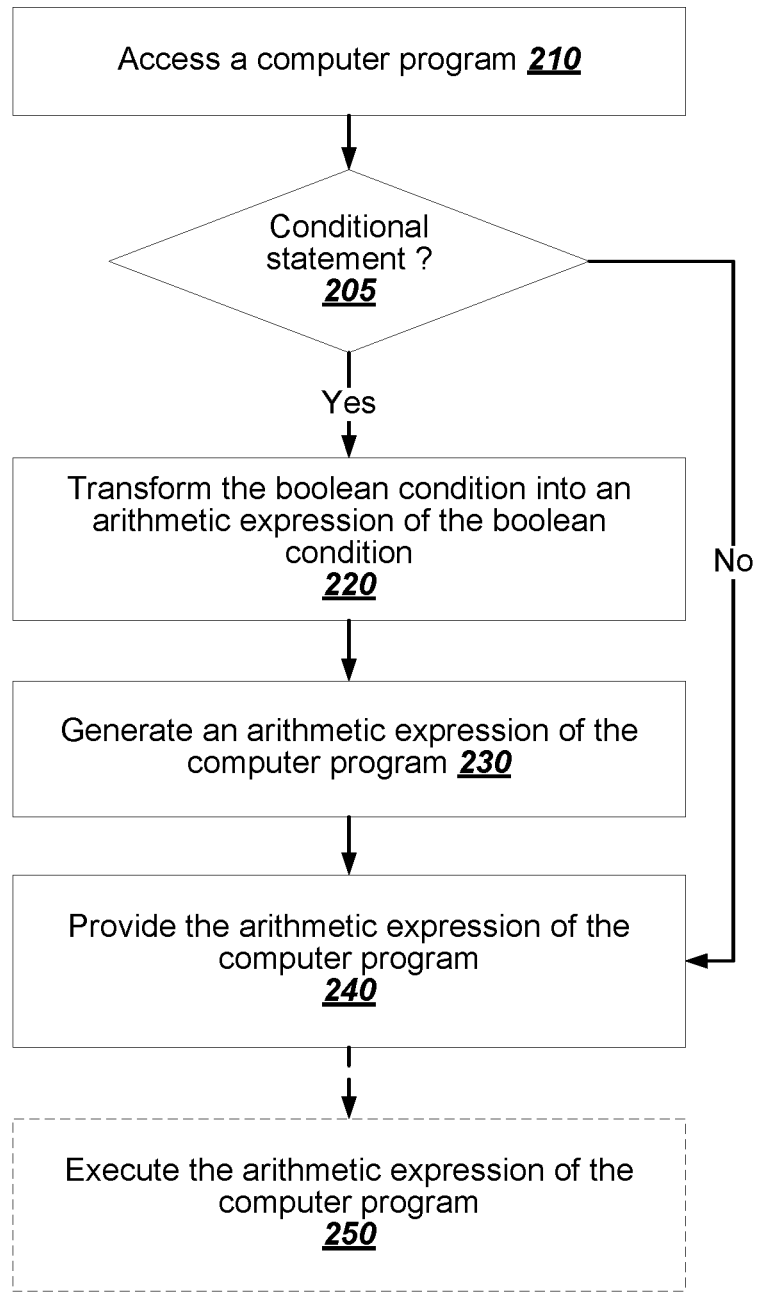
FIG. 2 is a flowchart of an example process for executing a computer program solely with arithmetic and/or bitwise unit(s) of a processor.

FIG. 2 is a flowchart of an example process for executing a computer program. The process can be implemented by one or more computer programs installed on one or more computers in one or more locations and programmed in accordance with this specification. For example, the process can be performed by the system 100 shown in FIG. 1. For convenience, the process will be described as being performed by a system of one or more computers. Some embodiments involve pre-processing the computer program to do the transformation, e.g., on an entirely different computer system, before the transformed computer program is executed on system 100. For example, a source compiler can do the transformation when producing object code and/or machine-level code for a target computer.

The system accesses (210) a computer program (e.g., computer program 182 of FIG. 1). The system determines (205) whether the computer program includes at least one conditional statement including a boolean condition. If the computer program includes at least one conditional statement, the system transforms (220) the boolean condition into an arithmetic and/or bitwise expression of the boolean condition. If the computer program does not include any conditional statement, the system provides (240) the arithmetic and/or bitwise expression of the computer to the ABU 130 for execution.

When executed, a conditional statement causes the processor to perform an associated task depending on whether a specified boolean condition evaluates to True or False. The task can include one or more computations and/or one or more actions. The specified boolean condition requires comparison of at least a variable with either a value or another variable. For example, the comparison can determine whether a value of a variable (e.g., A) is greater than (e.g., A>B), equal (e.g., A=B), or less than (e.g., A<B) a value of another variable (e.g., B). The result of the comparison determines with the associated task will be executed by the processor.

FIG. 3 is a pseudocode that illustrates the basic structure of an if-then(-else) conditional statement 310. When an interpreter finds an If, it expects a boolean condition 301 and evaluates that boolean condition 301 to either of the values True or False. If the condition is True, the processor executes a consequent task 302. Otherwise, the execution continues in the following branch. If there is an alternative task 303 (e.g., in an Else block), the processor executes the alternative task 303. If there is no Else branch, the processor executes the statement following the End If. After either branch has been executed, control returns to the point after the end If.

Referring again to FIG. 2, the system (e.g., transformation unit 121) transforms (220) the boolean condition into an arithmetic and/or bitwise expression of the boolean condition. The arithmetic and/or bitwise expression of the boolean condition takes the variables of the conditional statement as variables. In some implementations, the arithmetic and/or bitwise expression of the boolean condition is such that the output of the arithmetic and/or bitwise expression of the boolean condition verifies the following two properties. If the values of the variables verify the boolean condition, the arithmetic and/or bitwise expression of the boolean condition is equal to 1. If the values of the variables do not verify the boolean condition, the arithmetic and/or bitwise expression of the boolean condition is equal to 0. As such, boolean value TRUE is converted to 1, while boolean value FALSE is converted to 0. In execution, the arithmetic and/or bitwise expression of the boolean condition maintains the part of the executable code that is to be executed while nulling the parts that are not to be executed. The transformation of the boolean condition statement into an arithmetic and/or bitwise expression is described in more details in relation to FIG. 4.

The transformation can be performed at various levels of any suitable programming language. In particular, the method can be used in any suitable low-level language (e.g., assembly language, or at the level of the instruction set architecture (ISA)), as well as in any suitable high-level programming language (e.g., C++ code, or Java, etc.) of a particular software program. The process can be performed as a pre-processing step when compiling source code into executable code for a target machine, or on-the-fly processing when implemented in an interpreter rather than a compiler.

Examples of specific and general transformation formulas that can be used to transform the boolean condition into an arithmetic and/or bitwise expression are provided below.

Examples of specific transformation formulas (on asm and/or ISA level)
Specific Transformation Formula for Integer, Characters or Booleans Types
answer=$z^{|k|}$% z (for x=y and x>=y conditions)
answer=$1-z^{|k|}$% z (for others conditions)
Specific Transformation Formula for Float or Double Types
answer=$z^{ceil(|k|)}$% z (for x=y and x>=y conditions)
answer=$1-z^{ceil(|k|)}$% z (for other conditions)
Examples of general transformation formulas for all data types (incl. arrays and strings)
General transformation of boolean condition "if (=)"

$$answer = z^{(\sum_{i=1}^{N} z^{ceil(|A[i]-B[i]|\% z)})}\% z$$

General transformation of boolean condition "if (>=)"

$$answer = z^{(\sum_{i=1}^{N} z^{ceil((A[i]-B[i])-(|A[i]-B[i]|))\% z})}\% z$$

General transformation of boolean condition "if (<)"

$$answer = z^{(\sum_{i=1}^{N} 1-z^{ceil((A[i]-B[i])-(|A[i]-B[i]|))\% z})}\% z$$

General transformation of boolean condition "if (>)"

$$answer = z^{(\sum_{i=1}^{N} 1-z^{ceil((B[i]-A[i])-(|B[i]-A[i]|))\% z})}\% z$$

Notation:
z is a base number.
A, B is an array comprising N elements.
A[i], B[i] is an element of an array. A single element like an integer, a float, etc. is a one-dimension array (row vector matrix) with only one element.
answer is the arithmetic and/or bitwise expression of the boolean condition.
% is the remainder of division.
ceil(x) is a ceiling function that maps x to the least integer greater than or equal to x.
if the boolean condition is x=y, k=x-y
if the boolean condition is x≥y, k=(x-y)-(|x-y|)
x<y is "else" result for x≥y
The base number z can be the base of numeral system. Most arithmetic operations (e.g., power function and the remainder of the division) with the base of numeral system can be calculated immediately with shift operations. In particular, if the processor uses a binary system, z can be equal to 2.

In the case of arrays and strings, the elements of the array can be normalized. Any known normalization methods can be used. This improves the execution speed of the conditional statement.

Referring back to FIG. 2, the system (e.g., transformation unit 121) generates (230) an arithmetic and/or bitwise expression of the computer program. The system replaces the boolean condition in the computer program with the arithmetic and/or bitwise expression of the boolean condition. In execution, the arithmetic and/or bitwise expression of the boolean condition maintains the part of the executable code that is to be executed while nulling the parts that are not to be executed. The generation of the arithmetic and/or bitwise expression of the computer program is described in more details in relation to FIGS. 8 and 9.

The system (e.g., CU 120) provides (240) the arithmetic and/or bitwise expression of the computer program to an arithmetic and/or bitwise unit (e.g., ABU 130) for execution. The arithmetic and/or bitwise expression of the computer program can be in any suitable programming language, and in particular, any suitable low-level language (e.g., assembly language, or at the level of the instruction set architecture (ISA)), as well as in any suitable high-level programming language (e.g., C++ code, or Java, etc.) of a particular software program. The execution of the arithmetic and/or bitwise expression of the computer program does not require any direct comparison of numbers. The system can thus provide the arithmetic and/or bitwise expression of the computer program to the arithmetic and/or bitwise unit, and in particular an arithmetic and/or bitwise unit that does not include any digital comparator.

The system (e.g., ABU 130) executes (250) the arithmetic and/or bitwise expression of the computer program. The execution of the arithmetic and/or bitwise expression of the conditional statement provides the same result as the execution of the conditional statement while not requiring any comparison of numbers. As such, a processor that does not include any digital comparator can execute the computer program. The execution of a conditional statement with arithmetic body is described in more details in relation to FIGS. 11A and 11B. The execution of a conditional statement with non-arithmetic body is described in more details in relation to FIGS. 12A and 12B. As described in more details in relation to FIG. 10, the arithmetic and/or bitwise expression of the computer program can be fragmented and the fragments run in parallel (e.g., simultaneously, or concurrently) in particular in the case of multilevel conditional statements.

Figure 4:
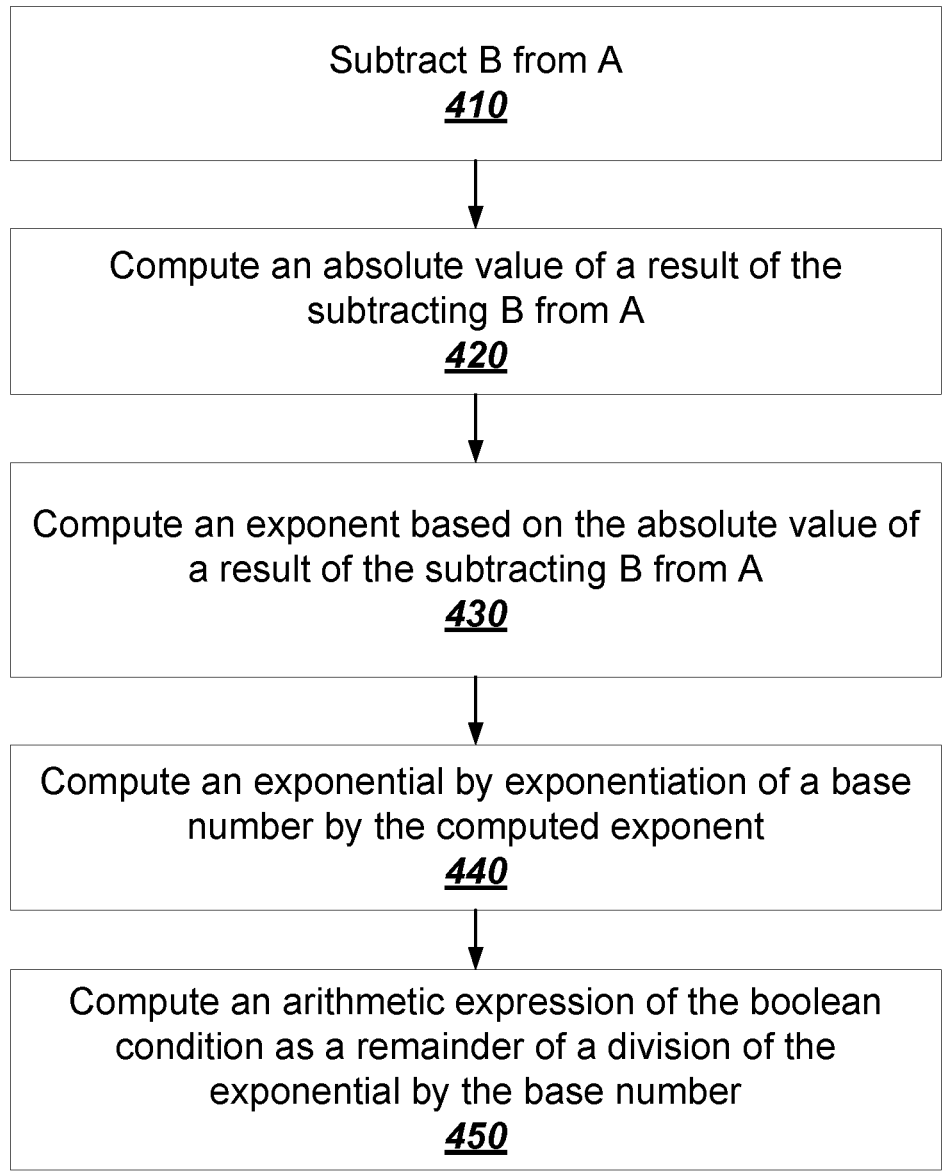
FIG. 4 is a flowchart of an example process for transforming a boolean condition into an arithmetic and/or bitwise expression.

FIG. 4 is a flowchart of an example process for transforming (e.g., 220 of FIG. 2) a boolean condition into an arithmetic and/or bitwise expression. The boolean condition takes A as a first variable and B as a second variable.

The system (e.g., transformation unit 121) subtracts (410) B from A.

The system (e.g., transformation unit 121) computes (420) an absolute value of the result of the subtraction.

The system (e.g., transformation unit 121) computes (430) an exponent based on the absolute value of the result of the subtraction.

The system (e.g., transformation unit 121) computes (440) an exponential by exponentiation of a base number by the computed exponent. The base number can be any number. In particular, the base number can be the base of the numeral system used by the processor. In particular, if the processor uses a binary system, the base number can be equal to 2. Most arithmetic operations (e.g., power function and the remainder of the division) with the base of numeral system can be calculated immediately with shift operations. In particular, the exponentiation of the base number by the computed exponent can be performed by shifting a bit, which is equal to 1, left by a number of places equal to the computed exponent. This improves the speed of execution.

The system (e.g., transformation unit 121) computes (450) the arithmetic and/or bitwise expression of the boolean condition as a remainder of a division of the exponential by the base number.

The exponent is computed such that the exponent is equal to 0 if the boolean condition is verified. Any number powered by 0 results in 1. As such, if the boolean condition is verified, the exponent is equal to 0, and the arithmetic and/or bitwise expression of the boolean condition will be equal to 1.

In some embodiments, the base number is 2. If the processor uses a binary system, the remainder of division of the exponential by the base number can be extracted by taking a last bit of the exponential. This reduces the complexity of the calculation.

Figure 5:
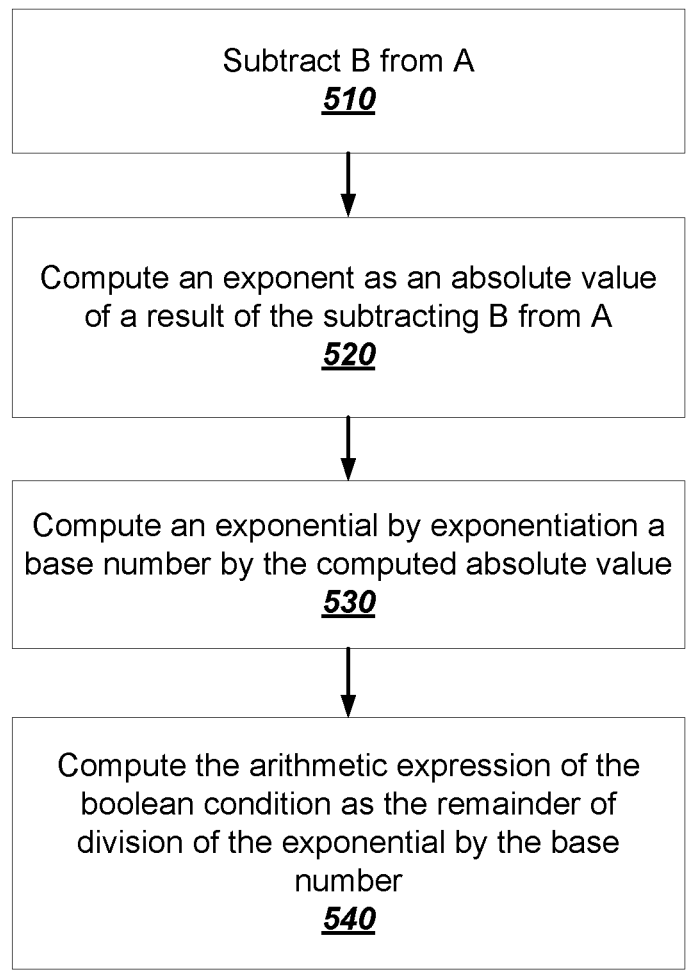
FIG. 5 is a flowchart of an example process for transforming A=B into an arithmetic and/or bitwise expression of A=B.

FIG. 5 is a flowchart of an example process for transforming boolean condition A=B into an arithmetic and/or bitwise expression of A=B.

The system (e.g., transformation unit 121) subtracts (510) B from A.

The system (e.g., transformation unit 121) computes (520) an exponent as the absolute value of the result of 510.

The system (e.g., transformation unit 121) computes (530) an exponential by exponentiation of the base number by the exponent computed at 520.

The system (e.g., transformation unit 121) computes (540) the arithmetic and/or bitwise expression of the boolean condition as the remainder of division of the exponential computed at 530 by the base number.

The arithmetic and/or bitwise expression of A=B is computed such that the following is verified. If A=B, the exponent is equal to 0, and the arithmetic and/or bitwise expression of A=B is equal to 1. If A≠B, the exponent is not equal to 0, and the arithmetic and/or bitwise expression of A=B is equal to 0.

Figure 6:
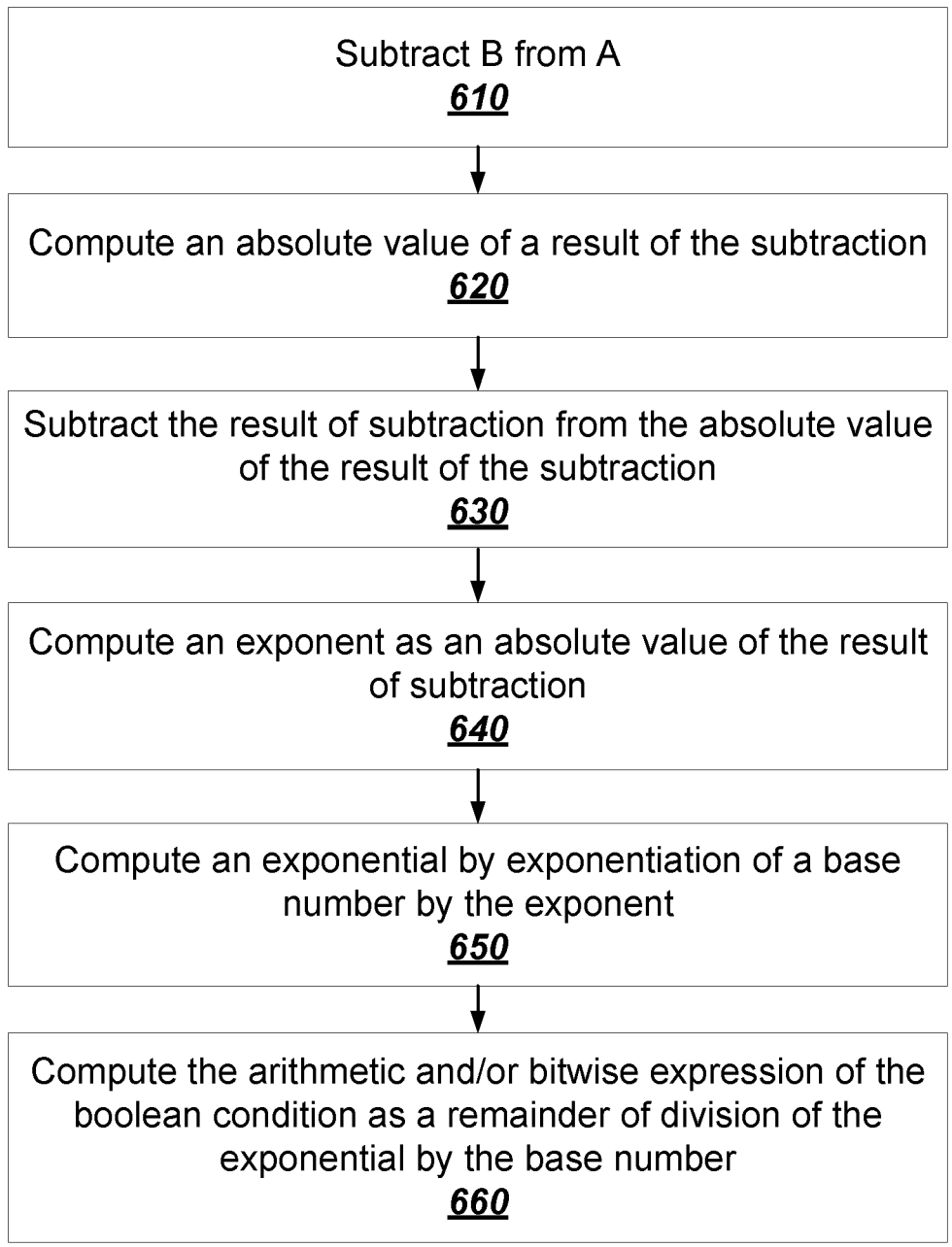
FIG. 6 is a flowchart of an example process for transforming A≥B into an arithmetic and/or bitwise expression of A≥B.

FIG. 6 is a flowchart of an example process for transforming boolean condition A≥B into an arithmetic and/or bitwise expression of A≥B.

The system (e.g., transformation unit 121) subtracts (610) B from A.

The system (e.g., transformation unit 121) computes (620) an absolute value of result of 610.

The system (e.g., transformation unit 121) subtracts (630) the result of 610 from the result of 620.

The system (e.g., transformation unit 121) computes (640) an exponent as an absolute value of the result of 630.

The system (e.g., transformation unit 121) computes (650) an exponential by exponentiation of a base number by the exponent computed at 640.

The system (e.g., transformation unit 121) computes (660) the arithmetic and/or bitwise expression of the boolean condition as the remainder of division of the exponential computed at 650 by the base number.

The arithmetic and/or bitwise expression of A≥B is computed such that the following is verified. If A≥B, the exponent is equal to 0, and the arithmetic and/or bitwise now abandoned expression of A≥B is equal to 1. If A<B, the exponent is not equal to 0, and the arithmetic and/or bitwise expression of A≥B is equal to 0.

Figure 7A:
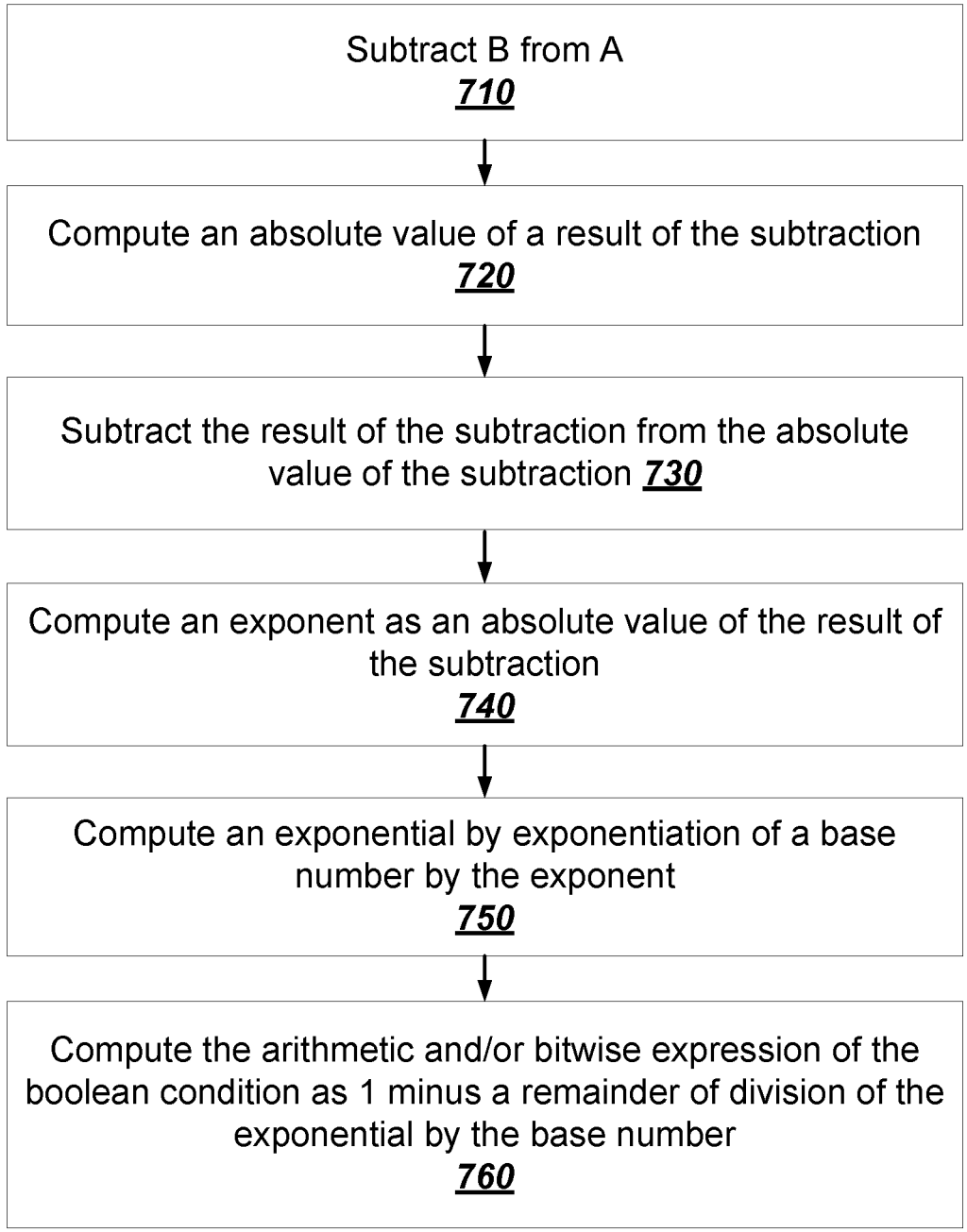
FIGS. 7A and 7B are flowcharts of example processes for transforming A<B into an arithmetic and/or bitwise expression of A<B.

FIG. 7A is a flowchart of an example process for transforming boolean condition A<B into an arithmetic and/or bitwise expression of A<B.

The system (e.g., transformation unit 121) subtracts (710) B from A.

The system (e.g., transformation unit 121) computes (720) an absolute value of result of 710.

The system (e.g., transformation unit 121) subtracts (730) the result of 710 from the result of 720.

The system (e.g., transformation unit 121) computes (740) an exponent as an absolute value of the result of 730.

The system (e.g., transformation unit 121) computes (750) an exponential by exponentiation of a base number by the exponent computed at 740.

The system (e.g., transformation unit 121) computes (760) the arithmetic and/or bitwise expression of the boolean condition as the remainder of division of the exponential computed at 750 by the base number.

The arithmetic and/or bitwise expression of A<B is computed such that the following is verified. If A<B, the exponent is equal to 0, and the arithmetic and/or bitwise expression of the boolean condition is equal to 1. If A≥B, the exponent is not equal to 0, and the arithmetic and/or bitwise expression of the boolean condition will be equal to 0.

Figure 7B:
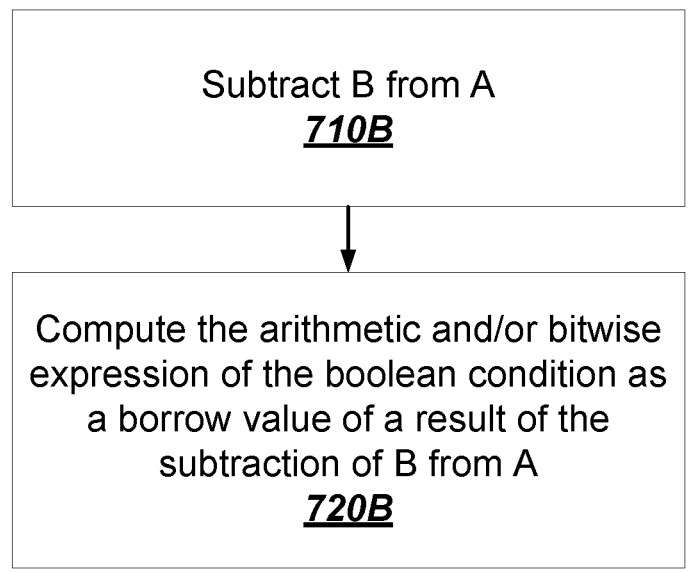

FIG. 7B is a flowchart of another example process for transforming boolean condition A<B into an arithmetic and/or bitwise expression of A<B.

The system (e.g., transformation unit 121) subtracts (710B) B from A.

The system (e.g., transformation unit 121) computes (720B) the arithmetic and/or bitwise expression of the boolean condition as a borrow value of the result of the subtraction of B from A.

The arithmetic and/or bitwise expression of A<B is computed such that the following is verified. If A<B, the borrow value of the result of the subtraction of B from A is equal to 1, and the arithmetic and/or bitwise expression of the boolean condition is equal to 1. If A≥B, the borrow value of the result of the subtraction of B from A is equal to 0, and the arithmetic and/or bitwise expression of the boolean condition is equal to 0.

FIG. 8 is a flowchart of an example process for generating (e.g., 230 of FIG. 2) an arithmetic and/or bitwise expression of the computer program when the conditional statement has an arithmetic body. An example is described in more details in relation to FIGS. 11A and 11B.

The system (e.g., transformation unit 121) multiplies (810) the statement of the consequent task (e.g., 302 of FIG. 3) by the arithmetic and/or bitwise expression of the boolean condition. As such, when the computer program is executed, the following happens. If the boolean condition is verified, the arithmetic and/or bitwise expression of the boolean condition is equal to 1, the consequent task is maintained by the multiplication with the arithmetic and/or bitwise expression of the boolean condition, and the consequent task is executed. If the boolean condition is not verified, the arithmetic and/or bitwise expression of the boolean condition is equal to 0, the consequent task is nullified by the multiplication with the arithmetic and/or bitwise expression of the boolean condition, and the consequent task is not executed.

If the conditional statement comprises an alternative task (e.g., 303 of FIG. 3) that is formulated as an arithmetic statement, the system (e.g., transformation unit 121) multiplies (820) the arithmetic consequent task by 1 minus the arithmetic and/or bitwise expression of the boolean condition. As such, when the computer program is executed, the following happens. If the boolean condition is verified, the arithmetic and/or bitwise expression of the boolean condition is equal to 1. The consequent task is maintained by the multiplication with the arithmetic and/or bitwise expression of the boolean condition, while the alternative task is nullified by the multiplication with 1 minus the arithmetic and/or bitwise expression of the boolean condition. As a result, the consequent task is executed, while the alternative task is not. If the boolean condition is not verified, the arithmetic and/or bitwise expression of the boolean condition is equal to 0, the consequent task is nullified by the multiplication with the arithmetic and/or bitwise expression of the boolean condition, while the alternative task is maintained by the multiplication with 1 minus the arithmetic and/or bitwise expression of the boolean condition. As a result, the alternative task is executed, while the consequent task is not.

FIG. 9 is a flowchart of an example process for generating (e.g., 230 of FIG. 2) an arithmetic and/or bitwise expression of the computer program when the conditional statement has a non-arithmetic body. An example is described in more details in relation to FIGS. 12A and 12B.

The system (e.g., transformation unit 121) includes in the arithmetic and/or bitwise expression of the computer program an unconditional jump to a label associated with the arithmetic and/or bitwise expression of the boolean condition. The label is initiated with the arithmetic and/or bitwise expression of the boolean condition such that the label is equal to the start statement of the consequent task (e.g., 302 of FIG. 3) when the arithmetic and/or bitwise expression of the conditions statement is equal to 1. As such, when the computer program is executed, the following happens. If the boolean condition is verified, the arithmetic and/or bitwise expression of the boolean condition is equal to 1. The label is equal to the start statement of the consequent task. The unconditional jump statement points to the consequent task. During execution, when the processor finds the unconditional jump statement, the processor executes the consequent task.

If there is an alternative task (e.g., 303 of FIG. 3), the label is further initiated such that it is equal to the start statement of the alternative task when the arithmetic and/or bitwise expression of the conditions statement is equal to 0. As such, when the computer program is executed, the following happens. If the boolean condition is verified, the arithmetic and/or bitwise expression of the boolean condition is equal to 1, the label is equal to the start statement of the consequent task, the unconditional jump statement points to the consequent task, and the consequent task is executed. If the conditional statement is not verified, the arithmetic and/or bitwise expression of the boolean condition is equal to 0, the label is equal to the start statement of the alternative task, the jump statement points to the alternative task, and the alternative task is executed.

FIG. 10 is a flowchart of an example process for providing (e.g., 240 of FIG. 2) the arithmetic and/or bitwise expression of the computer program and optionally executing (e.g., 250 of FIG. 2) the arithmetic and/or bitwise expression of the computer program. The arithmetic and/or bitwise expression is fragmented. The multiples fragments can then be executed by multiple arithmetic and/or bitwise blocks in parallel. As such, the execution speed of the processor can be improved by executing the computer program by multiple arithmetic blocks working in parallel. Further, multilevel conditional statements can be executed in parallel.

The system (e.g., transformation unit 121) fragments (1010) the arithmetic and/or bitwise expression of the computer program into multiples fragments.

The system (e.g., ABU 130) executes (1020) the fragments in parallel. In particular, the ABU 130 can perform multithreading. The ABU 130 execute at least two fragments in parallel. In particular, the fragments can be executed using Reverse Polish Notation.

FIG. 11A is an example of a C++ computer program that comprises a conditional statement 1101A with arithmetic body.

The boolean condition 1101A of the conditional statement 1101A is whether x is equal to y. The consequent task 1102 is that z is equal to 1. The alternative task 1103 is that z is equal to 0. The conditional statement 1110A can be expressed as follows: If x is equal to y, then z is equal to 1. If x is not equal to y, then z is equal to 0.

The execution of the conditional statement 1110A thus requires the comparison of variables x and y.

FIG. 11B is an example of a C++ computer program resulting from the transformation of the computer program of FIG. 11A.

The conditional statement 1110A has been transformed into an arithmetic and/or bitwise expression 1110B comprising only arithmetic and/or bitwise operations. The arithmetic and/or bitwise expression 1101 of the boolean condition is z=1<<(x-y))%2. As such, if x is equal to y, then z=1<<(x-y))%2=1, and if x is not equal to y, then z=1<<(x-y))%2=0.

The execution of the arithmetic and/or bitwise expression 1101B of the conditional statement thus provides the same result as the execution of the conditional statement 1101A but does not require the comparison of variables x and y.

FIG. 11C is an example of an assembly language computer program 1100C that comprises a conditional statement with arithmetic body. FIG. 11D is an example of an assembly language computer program 1100D resulting from the transformation of the computer program of FIG. 11C.

FIG. 12A is an example of a C++ computer program that comprises a conditional statement 1201A with a non-arithmetic body The boolean condition 1201A of the conditional statement 1201A is whether x is equal to y. The consequent task 1201 is to output "Equals." The alternative task 1202 is to output "Not equals." The conditional statement 1210A can be expressed as follows. If x is equal to y, the program outputs "Equals." If x is not equal to y, the program outputs "Not equals".

FIG. 12B is an example of a C++ computer program resulting from the transformation of the computer program of FIG. 12A.

The conditional statement 1210A has been transformed into an arithmetic and/or bitwise expression 1210B comprising only arithmetic and/or bitwise operations. The arithmetic and/or bitwise expression of the boolean condition 1201B is res=(1<<k) %2, where k=x-y. As such, if x=y, res=(1<<k) %2=1, while if x≠y, res=(1<<k) %2=0. An unconditional jump 1204 is initialized in an initialization statement 1205. The unconditional jump provides an unconditional jump to a label ("condition[res]").

When the arithmetic and/or bitwise expression of the conditions statement is equal to 1 (res=1), the label ("condition[1]") is equal to the start statement ("to_do") of the consequent task 1201. The unconditional jump statement points to the consequent task 1201. During execution, when the processor finds the unconditional jump statement 1204, the processor executes the consequent task 1201.

When the arithmetic and/or bitwise expression of the conditions statement is equal to 0 (res=0), the label ("condition[0]") is equal to the start statement ("elso_do") of the alternative task 1202. The unconditional jump statement points to the alternative task 1202. During execution, when the processor finds the unconditional jump statement 1204, the processor executes the alternative task 1202.

The execution of the arithmetic and/or bitwise expression of the conditional statement thus provides the same result as the execution of the conditional statement.

FIG. 12C is an example of an assembly language computer program 1200C that comprises a conditional statement with non-arithmetic body. FIG. 12D is an example of an assembly language computer program 1200D resulting from the transformation of the computer program of FIG. 12C.

Figure 13A:
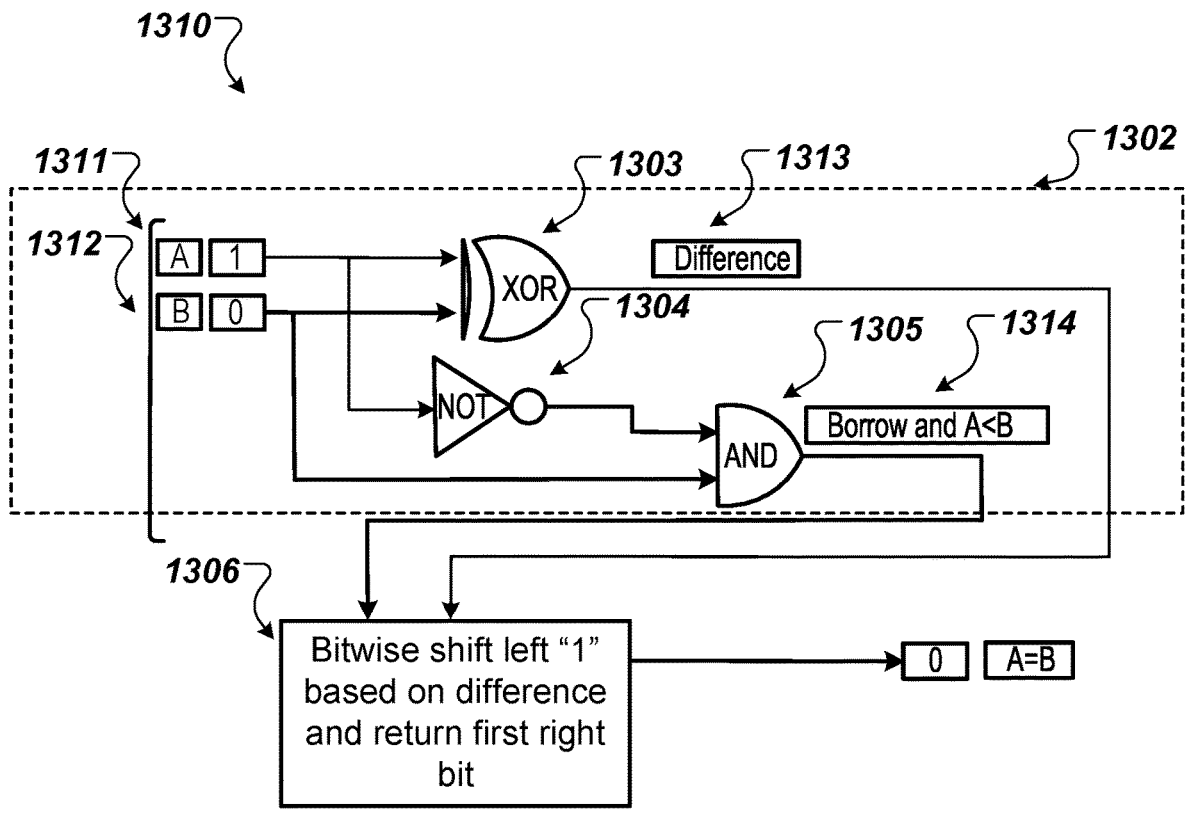
FIG. 13A and FIG. 13B illustrate examples of the combinational logic circuitry of an integrated circuit of an arithmetic and/or bitwise operation unit.

FIG. 13A illustrates an example of a combinational logic circuitry 1310A of an integrated circuit of an ABU.

The combinational logic circuitry 1310A comprises a half subtractor 1302 which is used to perform subtraction of two bits. The half substractor comprises a XOR gate 1303, a NOT gate 1304, and an AND gate 1305. The half substractor 1302 has two inputs: the minuend A 1311 and the subtrahend B 1312. The half substractor 1302 has two outputs: the difference 1313 and borrow out 1314. The borrow out signal 1314 is set when the conditional logic circuitry 1310A needs to borrow from the next digit in a multi-digit subtraction. The borrow out signal 1314 is equal to 1 only if A is equal to 0 and B is equal to 1. The borrow out signal is thus equal to 1 when A<B, and equal to 0 when A≥B. Therefore, the borrow out signal provides an evaluation of boolean condition A<B.

A shift operator 1306 shifts a bit, whichc is equal to 1, to the left by a number of places equal to the difference signal 1313. This results in the exponentiation of the base number by the result of the subtraction of B from A. The shift operator 1306 outputs the first right bit of the result which is equal to the remainder of division of the exponential of the bases number by the result of the subtraction of B from A. The output of the shift operator 1306 is thus equal to 1 when A=B, and equal to 0 when A≠B. The shift operator 1306 output therefore provides an evaluation of boolean condition A=B.

Figure 13B:
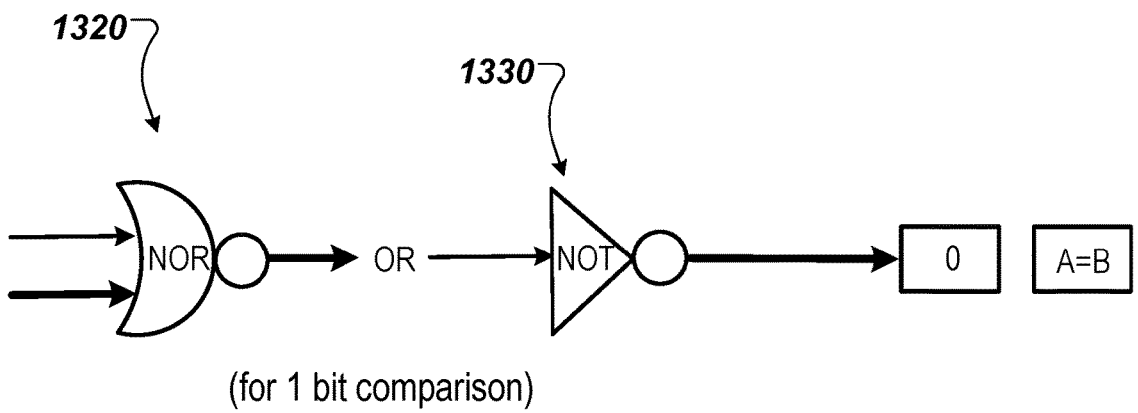

FIG. 13B illustrates an example of a combinational logic circuitry 1310B of an integrated circuit of an ABU when the variables A and B each only include one bit. The conditional logic circuitry 1310B includes a NOR gate 1320, and a NOT gate 1330. The output of the NOT gate 1330 provides an evaluation of boolean condition A=B.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    accessing a computer program, wherein the computer program comprises a conditional statement that comprises a boolean condition;
    transforming the boolean condition into an arithmetic and/or bitwise expression of the boolean condition;
    generating an arithmetic and/or bitwise expression of the computer program comprising the arithmetic and/or bitwise expression of the boolean condition in place of the boolean condition;
    providing the arithmetic and/or bitwise expression of the computer program, wherein the arithmetic and/or bitwise expression of the computer program is configured to be executed by an arithmetic and/or bitwise operation unit of a processor; and
    executing, by the arithmetic and/or bitwise operation unit, the arithmetic and/or bitwise expression of the computer program;
    wherein the boolean condition takes a first variable A and a second variable B, wherein transforming the boolean condition into the arithmetic and/or bitwise expression of the boolean condition comprises:
    subtracting B from A;
    computing an absolute value of a result of the subtracting B from A;
    computing an exponent based on the absolute value of the result of the subtracting B from A;
    computing an exponential by exponentiation of a base number by the computed exponent; and
    computing the arithmetic and/or bitwise expression of the boolean condition based on a remainder of a division of the exponential by the base number.

2. The method of claim 1, wherein the arithmetic and/or bitwise expression of the boolean condition verifies the following:
    if the boolean condition is verified, the arithmetic and/or bitwise expression of the boolean condition is equal to 1; and
    if the boolean condition is not verified, the arithmetic and/or bitwise expression of the boolean condition is equal to 0.

3. The method of claim 2, wherein the boolean condition comprises a consequent task that is formulated as an arithmetic statement, and wherein generating the arithmetic and/or bitwise expression of the computer program comprises:
    multiplying the consequent task with the arithmetic and/or bitwise expression of the boolean condition.

4. The method of claim 3, wherein the boolean condition comprises an alternative task that is formulated as an arithmetic statement, and wherein generating the arithmetic and/or bitwise expression of the computer program comprises:
    multiplying the alternative task with a 1 minus the arithmetic and/or bitwise expression of the boolean condition.

5. The method of claim 2, wherein the boolean condition comprises a consequent task that is formulated as a non-arithmetic statement, and wherein generating the arithmetic and/or bitwise expression of the computer program comprises:
    including in the arithmetic and/or bitwise expression of the computer program an unconditional jump to a label associated with the arithmetic and/or bitwise expression of the boolean condition.

6. The method of claim 5, wherein the label is equal to a start of a statement of the consequent task when a value of the arithmetic and/or bitwise expression of the boolean condition is equal to 1.

7. The method of claim 6, wherein the boolean condition comprises an alternative task that is formulated as a non-arithmetic statement, wherein the label is equal to a start of a statement of the alternative task when the value of the arithmetic and/or bitwise expression of the boolean condition is equal to 0.

8. The method of claim 1, wherein the boolean condition is A=B, and wherein transforming the boolean condition into the arithmetic and/or bitwise expression of the boolean condition comprises:
    computing the exponent as the absolute value of the result of the subtracting B from A; and
    computing the arithmetic and/or bitwise expression of the boolean condition as the remainder of the division of the exponential by the base number.

9. The method of claim 1, wherein the boolean condition is A≥B, wherein transforming the boolean condition into the arithmetic and/or bitwise expression of the boolean condition comprises:
    subtracting the result of the subtracting B from A from the absolute value of the result of the subtracting B from A;
    computing the exponent as an absolute value of a result of the subtracting the result of the subtracting B from A from the absolute value of the result of the subtracting B from A; and
    computing the arithmetic and/or bitwise expression of the boolean condition as the remainder of the division of the exponential by the base number.

10. The method of claim 1, wherein the boolean condition is A<B, wherein transforming the boolean condition into the arithmetic and/or bitwise expression of the boolean condition comprises:
    subtracting the result of the subtracting B from A from the absolute value of the result of the subtracting B from A;
    computing the exponent as an absolute value of a result of the subtracting the result of the subtracting B from A from the absolute value of the result of the subtracting B from A;
    computing the exponential by exponentiation of the base number by the exponent; and
    computing the arithmetic and/or bitwise expression of the boolean condition as 1 minus the remainder of the division of the exponential by the base number.

11. The method of claim 1, wherein the base number is equal to 2, wherein the processor uses a binary system, and wherein the remainder of the division of the exponential by the base number is extracted by taking a last bit of the exponential.

12. The method of claim 1, wherein the processor uses a binary system, and wherein the exponentiation of the base number by the computed exponent is performed by shifting a bit, which is equal to 1, left by a number of places equal to the computed exponent.

13. The method of claim 1, wherein providing the arithmetic and/or bitwise expression of the computer program comprises:
fragmenting the arithmetic and/or bitwise expression of the computer program into multiple fragments of arithmetic and/or bitwise expression; and
wherein the fragments of arithmetic and/or bitwise expression are configured to be executed in parallel.

14. A system comprising:
one or more instruction processing units comprising at least one control unit, at least one arithmetic and/or bitwise operation unit, and at least one register unit; and
one or more memory units coupled with the one or more instruction processing units;
wherein the at least one control unit is configured to perform operations comprising:
accessing a computer program, wherein the computer program comprises a conditional statement that comprises a boolean condition;
transforming the boolean condition into an arithmetic and/or bitwise expression of the boolean condition;
generating an arithmetic and/or bitwise expression of the computer program comprising the arithmetic and/or bitwise expression of the boolean condition in place of the boolean condition; and
providing the arithmetic and/or bitwise expression of the computer program, wherein the arithmetic and/or bitwise expression of the computer program is configured to be executed by the at least one arithmetic and/or bitwise operation unit of the one or more instruction processing units, thereby causing execution, by the at least one arithmetic and/or bitwise operation unit, the arithmetic and/or bitwise expression of the computer program;
wherein the boolean condition takes a first variable A and a second variable B, wherein transforming the boolean condition into the arithmetic and/or bitwise expression of the boolean condition comprises:
subtracting B from A;
computing an absolute value of a result of the subtracting B from A;
computing an exponent based on the absolute value of the result of the subtracting B from A;
computing an exponential by exponentiation of a base number by the computed exponent; and
computing the arithmetic and/or bitwise expression of the boolean condition based on a remainder of a division of the exponential by the base number.

15. The system of claim 14, wherein the at least one arithmetic and/or bitwise operation unit comprises one or more of an arithmetic block, a bitwise shift block, and a bitwise logical block, and wherein the at least one arithmetic and/or bitwise operation unit does not include any digital comparator.

16. The system of claim 14, wherein the boolean condition is A=B, and wherein transforming the boolean condition into the arithmetic and/or bitwise expression of the boolean condition comprises:
computing the exponent as the absolute value of the result of the subtracting B from A; and
computing the arithmetic and/or bitwise expression of the boolean condition as the remainder of the division of the exponential by the base number.

17. The system of claim 14, wherein the boolean condition is A≥B, wherein transforming the boolean condition into the arithmetic and/or bitwise expression of the boolean condition comprises:
subtracting the result of the subtracting B from A from the absolute value of the result of the subtracting B from A;
computing the exponent as an absolute value of a result of the subtracting the result of the subtracting B from A from the absolute value of the result of the subtracting B from A; and
computing the arithmetic and/or bitwise expression of the boolean condition as the remainder of the division of the exponential by the base number.

18. The system of claim 14, wherein the boolean condition is A<B, wherein transforming the boolean condition into the arithmetic and/or bitwise expression of the boolean condition comprises:
subtracting the result of the subtracting B from A from the absolute value of the result of the subtracting B from A;
computing the exponent as an absolute value of a result of the subtracting the result of the subtracting B from A from the absolute value of the result of the subtracting B from A;
computing the exponential by exponentiation of the base number by the exponent; and
computing the arithmetic and/or bitwise expression of the boolean condition as 1 minus the remainder of the division of the exponential by the base number.

19. The system of claim 14, wherein the base number is equal to 2, wherein the one or more instruction processing units use a binary system, wherein the remainder of the division of the exponential by the base number is extracted by taking a last bit of the exponential; and wherein the exponentiation of the base number by the computed exponent is performed by shifting a bit, which is equal to 1, left by a number of places equal to the computed exponent.

20. The system of claim 14, wherein providing the arithmetic and/or bitwise expression of the computer program comprises:
fragmenting the arithmetic and/or bitwise expression of the computer program into multiple fragments of arithmetic and/or bitwise expression; and
wherein the fragments of arithmetic and/or bitwise expression are configured to be executed in parallel.

* * * * *

UNITED STATES PATENT AND TRADEMARK OFFICE
CERTIFICATE OF CORRECTION

PATENT NO. : 11,029,920 B1  
APPLICATION NO. : 17/076726  
DATED : June 8, 2021  
INVENTOR(S) : Timur Ryspekov Page 1 of 1

It is certified that error appears in the above-identified patent and that said Letters Patent is hereby corrected as shown below:

In the Specification

In Column 4, Line 66, delete "with" and insert -- whether -- therefor.

In Column 10, Line 42, delete "1101A" and insert -- 1110A -- therefor.

In Column 10, Line 45, delete "1101A" and insert -- 1110A -- therefor.

In Column 10, Line 63, delete "1101A" and insert -- 1110A -- therefor.

In Column 11, Line 4, delete "1201A" and insert -- 1210A -- therefor.

In Column 11, Line 7, delete "1201A" and insert -- 1210A -- therefor.

Signed and Sealed this  
Twenty-eighth Day of June, 2022

Katherine Kelly Vidal  
*Director of the United States Patent and Trademark Office*